3,817,925
HEAT BARRIER COMPOSITION
Rudy M. Gunnerman, Beverly Hills, Calif. (% Insulation Systems, Inc., 11233 Condor Ave., Fountain Valley, Calif. 92708)
No Drawing. Continuation-in-part of application Ser. No. 763,967, Sept. 30, 1968, which is a continuation-in-part of application Ser. No. 713,231, Mar. 14, 1968, both now abandoned. This application June 25, 1971, Ser. No. 156,993
Int. Cl. C08j 1/30
U.S. Cl. 252—62                                        18 Claims

ABSTRACT OF THE DISCLOSURE

A heat barrier comprising a bonded intimate admixture of alkaline earth metal sulfate and finely divided carbonaceous material providing a source of available carbon, said barrier having a surface coating comprising alkaline earth metal sulfide, formed by in situ reaction of alkaline earth metal sulfate and carbon under the influence of heat, which restricts transfer of thermal energy.

---

This application is a continuation-in-part of my application filed Sept. 30, 1968, Ser. No. 763,967, now abandoned, entitled "Heat Barrier Composition," which in turn is a continuation-in-part of my application filed Mar. 14, 1968, Ser. No. 713,231, now abandoned, entitled "Gypsum Phenolic Sphere Composition."

This invention relates to the production and use of a heat barrier product having a surface coating which is effective to restrict the transmission of thermal energy.

It is an object of this invention to produce a heat barrier product which may be either formed as a block, sheet or other suitable form depending upon the particular application and which is so formed that it may be applied directly to any surface or used under any condition where it is the desire to protect against heat transmission.

It is another object of this invention to produce an insulating material which may be of low density and which has high heat barrier characteristics resulting from the formation in situ upon the surface of that material of an alkaline earth sulfide which as formed provides a very effective heat barrier which either reflects or disperses heat producing energy and thus inhibits the transmission of heat through the material.

It is another object of this invention to provide a heat barrier product which is composed of an intimate mixture of alkaline earth sulfates and finely divided carbonaceous material which sets and which exhibits under the application of high temperature conditions the property of producing a heat barrier upon the surface which acts to reject or reflect heat-producing energy and which avoids or prevents to a considerable degree transmission of heat through the composition as formed and also is effective upon its formation in retarding the erosion of the composition under such conditions.

It is another object of this invention to provide a heat barrier product wherein the rigidity of the product formed is controlled by selecting the materials forming the product in such manner as to permit the formation of a flexible composition which still retains the characteristics of providing an effective heat barrier.

It has heretofore been suggested that lightweight aggregates for plaster walls may be prepared by mixing phenolic resin as powder, granules, or Microballoons with gypsum plaster and that when so used the phenolic resin acts as a replacement for such other lightweight aggregate materials such as perlite. For example, see the patent to Veatch et al. No. 2,797,201.

I have discovered that an effective heat barrier can be produced in situ upon the surface of a composition consisting essentially of an intimate admixture of alkaline earth sulfates and finely divided carbonaceous material. Upon application of heat to a surface of such a composition, the alkaline earth metal sulfate and carbon react, primarily at the surface of the composition, whereby the sulfates are reduced to sulfides to provide an effective thermal barrier on such surface.

Sulfides of the character here under consideration and their formation and uses are best exemplified by the article by John M. Blocher, Jr. appearing in "High-Temperature Technology," Editor-in-Chief I. E. Campbell, published by John Wiley & Sons, Inc., New York and Chapman & Hall, Limited, London, as sponsored by The Electrochemical Society, Inc. of New York, wherein pages 187 to 205 set forth what is apparently the best knowledge with respect to the formation and uses of such sulfides and at the same time states that these sulfides, viewed as refractory sulfides for the most part, are to be considered as laboratory curiosities.

I have further discovered that upon the formation of such sulfides upon the surface of an alkaline earth metal sulfate composition containing carbonaceous material, such as carbon-containing plastics, which decompose to active carbon upon application of sufficient heat, heat penetration into the composition is so reduced as to effectively retard or prevent further decomposition of the carbonaceous material thereby retarding or preventing further reduction of the sulfates to the sulfides so that erosion of the material upon such application of heat is effectively controlled.

I have also discovered that the alkaline earth sulfide coating formed upon the surface of my products is so effective as a heat barrier that even under application of extreme heat thereto by arc plasma jet flames, heat penetration into the body of the product is inhibited to such a degree that the back surface layer of the coated product does not rise materially in temperature.

I have also discovered that the formation of the alkaline earth sulfide coating upon the surface of such products where oxyacetylene gas torch flames are applied directly to such surface results in the same apparent restriction of the heat flow into the material. I have also found that the same results are accomplished through application of any other high temperature conditions applied to the surface such, for example, as are existent in the exhaust at the firing of rocket engines or the like.

I have further found that the formation of the sulfide coating is a surface condition in that the material is not seriously eroded during such application of high temperature to its surface due, I believe, to the fact that when the sulfides are formed upon the surface they act to either reflect or disperse the heat producing energy so that the heat flow into the composition is at such a rate that the temperature of the material underlying such sulfide surface does not rise to the point that further sulfides are formed thereunder.

The compositions of my invention may be formed by using calcined alkaline earth sulfates, i.e., those sulfates which are not fully hydrated. The sulfates may be mixed with water to form a slurry to which carbonaceous material in the condition of fine subdivision is added and thoroughly admixed. The mixture is allowed to set due to hydration of the alkaline earth sulfates so that there is formed a composition in which the alkaline earth sulfates crystals form a matrix in which the particles of finely divided carbonaceous material are held in intimate mixture therewith. The composition, before setting, can be formed into sheets or blocks or can be applied directly to the surface to be protected from heat. When high temperature is applied thereto, there results the formation upon the surface of an alkaline earth sulfide due to the reduction of the sulfate to the sulfide by the carbon which is available at such surface.

The term "high temperature" as used herein means a temperature in the order of 900° C. or greater, i.e. at least that temperature at which the sulfates react with carbon to form sulfides.

The sulfide forms an apparent thin layer or coating upon the surface of the composition. Under conditions where the flame temperature applied to the surface is approximately 10,000° F., it has been found that the back temperature away from the flame, in a composition of ½ inch thickness and where the continued application of the flame through the said surface is for a period of twenty-four seconds, has reached a temperature no higher than about 140° F. The sulfide barrier formed upon the surface also acts by its property of restriction of heat flow to so reduce heat transmission into the material that the formation of further sulfides is retarded in the composition as will be demonstrated by the test data hereinafter set forth.

The alkaline earth sulfates which are applicable for use in carrying out my invention include magnesium sulfate, calcium sulfate, strontium sulfate, barium sulfate, and all of the alkaline earth sulfates of Periodic Table 2-A as well as mixtures of any of these sulfates.

The carbonaceous materials which are useful for carrying out my invention include all materials which will provide available carbon under the influence of sufficient heat to effect the reaction of carbon with sulfates according to the representative equation:

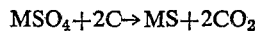

$$MSO_4 + 2C \rightarrow MS + 2CO_2$$

where M is an alkaline earth metal.

These materials include all forms of free carbon, such as carbon black, charcoal, coke, and graphite as well as those materials which will decompose, coke or char under the influence of heat to produce available carbon. The latter materials include carbonaceous materials of natural origin, such as, coal, tars, pitches, asphalts, sawdust, nutshells, and other wood or vegetable wastes, natural rubber, gums and resins and materials of synthetic origin including substantially all of the carbon-containing synthetic resins. The carbonaceous materials may be employed in the form of particles which are already of small size or which have been reduced in size by comminuting or by process of manufacture. Mixtures of the various carbonaceous materials may be used as desired. One class of suitable materials is that known under the trademark "Microballoons" as disclosed in Pat. No. 2,797,201. The carbonaceous material may be any of the heat-decomposable film-forming materials, disclosed in this patent including cellulose derivatives, such as cellulose acetate, cellulose acetate-butyrate, and cellulose acetate-propionate, thermoplastic synthetic resins, such as polyvinyl resins, i.e., polyvinyl alcohol (water- or organic solvent-soluble), polyvinyl chloride, copolymers of vinyl chloride and vinyl acetate, polyvinyl butyral, polystyrene, polyvinylidene chloride, acrylic resins such as polymethyl methacrylate, polyallyl, polyethylene, and polyamide (nylon) resins, and thermo-setting resins, such as alkyd, phenol-formaldehyde, urea-formaldehyde and melamine-formaldehyde resins, natural film-forming materials including soybean protein, zein protein, alginates, and cellulose.

It is important that the carbonaceous material be finely divided in order that it may be intimately dispersed in the alkaline earth metal sulfate so that carbon is available at substantially all points over the surfce area of product composition, whereupon application of heat to such surface will provide a substantially complete coating of alkali metal sulfide over such surface with exclusion of uncoated portions which might otherwise destroy the effectiveness of the product material as a heat barrier. In general, the carbonaceous material should have a maximum average particle size below about 500 microns and, in particular, where hollow spheres of film-forming materials are used the particle size should be below about 500 microns not only to provide the necessary available carbon over the entire surface area but to avoid formation of surface irregularities and holes due to melting or collapsing of the spheres under the influence of heat. Thus, where "Microballoons" such as those described in Pat. No. 2,797,201 are used as a source of carbonaceous material, they should have an average diameter of about 1 to 500 microns, preferably 1 to 250 microns.

The proportions of carbonaceous material to alkaline earth sulfate may be varied depending upon the conditions of application or use desired, the nature of the particular carbonaceous material used, the strength and/or flexibility of the desired product, and the like. The optimum amount of each carbonaceous material necessary to give the desired sulfide coating is readily determined by simple experimentation. I prefer to use about 0.1 to 5 parts by volume of carbonaceous material to 1 part by volume of alkaline earth metal sulfate.

The application of heat to the surface of my heat barrier materials may be from any source which will provide a temperature sufficient to cause the reaction between the alkaline earth metal sulfate and carbon. For example, the heat may be from an electrical source, nuclear energy source, or may be provided by a flame. Flames of reducing, neutral or oxidizing nature will cause the reaction to occur. The reaction between sulfate and carbon occurs at a temperature of about 900° C. Continued heating at higher temperatures may cause some reaction between alkaline earth metal sulfide and sulfate to form alkaline earth metal oxide. However, the presence of some oxide in the sulfide surface coating is not detrimental and is considered within the scope of my invention.

Where organic material other than free carbon is used, my theory of the operation performed under the conditions stated is that the carbonaceous material chars at its temperature of decomposition leaving primarily carbon in intimate mixture with the sulfate. Ordinarily the water of crystallization of hydrated sulfates is dissipated before or at the decomposition temperature. Upon decomposition and further application of heat the carbon acts as a reducing agent to reduce the alkaline earth sulfate to the sulfide as a surface condition upon the composition. This formation of alkaline earth sulfides on the surface is as a thin film which appears under the influence of the heat conditions above set forth to be in the nature of a layer which is adherent to the composition and acts either by heat-producing energy reflection or dispersion as a barrier which reduces to a high degree the transmission of the heat further into the material or composition. The surface condition having been formed, further heat transmission into the composition is inhibited so that further charring of the carbonaceous material is slowed down as is further reduction of the sulfate to the sulfide.

I have found under these conditions that the strength of the composition underlying the surface is not materially affected. Under the conditions as hereinabove expressed where a flame of approximately 10,000° F. is applied to the surface for twenty-four seconds upon a composition of ½ inch thickness, the surface erosion of the composition was found to be in the neighborhood of 0.199" and as previously set forth the back surface temperature of the ½ inch thickness of material had reached a temperature of only in the neighborhood of 140° F.

I have further discovered that I am able to control the flexibility of the composition of my invention by, in effect, interrupting the crystalline interlock of the alkaline earth sulfates forming the composition by adding to the composition of alkaline earth sulfates, thermoplastic carbonaceous materials such as the thermoplastic vinyl, styrene, acrylic, cellulosic, olefinic, and nylon polymers and copolymers, so that I am able to produce a flexible composition as distinguished from a hard inflexible material without interfering with the fundamental property of forming the sulfide upon the surface thereof under conditions of heat application as hereinabove set forth. Thermoplastics such as the polyvinyl alcohols and polyvinyl acetates may be dissolved or suspended in the water used to form the alkaline earth metal sulfate slurry. Mixtures of the various carbonaceous materials both thermosetting and thermoplastic may be used. The formation of the composition having flexible as distinguished from rigid characteristics enables the composition to be used and applied under conditions where rigidity of the composition would deter its application.

I have further found that in the preparation of the composition embodying my invention that I am able to produce the composition in such manner as to avoid the formation of cracks or fissures in the material upon the conditions of application of high temperature to its surface as hereinabove defined by incorporating in the slurry formed of the alkali earth sulfates and carbonaceous material a strain or grid of fiber glass either at the surface or embedded in the composition as it is allowed to set.

The following are set forth as specific examples of the composition embodying my invention and of the test results observed.

EXAMPLE I

Calcium sulfate, i.e., calcium sulfate hemihydrate ($CaSO_4 \cdot \tfrac{1}{2} H_2O$) is mixed with water to form a slurry using the same proportions of calcium sulfate hemihydrate and water as is ordinarily used in forming a slurry for casting purposes. The slurry thus formed as allowed to stand for such period of time as will permit the addition thereto of phenolic resin either in finely ground condition or as Microballoons without the tendency of the said phenolic resin to separate during the subsequent setting, which thereby forms a matrix holding the phenolic resin intimately dispersed with the calcium sulfate throughout the composition. In this composition I employ in this specific example 30% by volume of $CaSO_4 \cdot \tfrac{1}{2} H_2O$ and 70% by volume of finely divided phenolic resin of 500 micron maximum average particle size and the amount of water added to form the slurry is in accordance with good practice that amount which will permit the formation of a thick cream slurry, i.e., in most cases employing the minimum of water which will permit the formation of a uniform intimate mixture of the $CaSO_4 \cdot \tfrac{1}{2} H_2O$ and phenolic resin. The ratio of $CaSO_4 \cdot \tfrac{1}{2} H_2O$, phenolic resin and water employed in forming the composition may, of course, be varied depending upon the conditions of application or use desired and is not herein set forth as a limitation of the proportions of ingredients used in carrying out my invention.

I have similarly prepared compositions employing magnesium sulfate, strontium sulfate, and barium sulfate, and phenolic resin, and others of the carbonaceous plastics.

EXAMPLE II

In producing the composition embodying my invention so that it will have flexibility as distinguished from rigid compositions produced by the above set forth example, I have in a similar manner produced the slurry of the alkaline earth sulfate and water and thermosetting plastic and have added thereto a suspension of thermoplastic material and have found that the composition thereby produced is flexible as distinguished from a rigid composition. Specifically, I have mixed 100 parts by volume of $CaSO_4 \cdot \tfrac{1}{2} H_2O$, sufficient water to form the slurry as above described, to which I have added 200 parts by volume of phenolic resin, and 100 parts by volume of the approximately 50% suspension of polyvinyl acetate in water and have found that upon setting, the resultant composition was flexible as distinguished from the rigid composition produced by the first stated example. The operation apparently performed in this example is that the addition of the vinyl plastics to the composition in excess of that set forth in the first example given has prevented the complete interlock of the crystals of the alkaline earth sulfate, leaving the composition flexible.

HEAT-BARRIER TESTS

A test block of the composition was prepared in the manner hereinabove set forth in Example I in which proportions were 70% by volume of phenolic resin Microballoons (max. average particle size 500) to 30% by volume of $CaSO_4 \cdot \tfrac{1}{2} H_2O$ with water which was allowed to set to form test blocks which were 2″ x 2″ square and of ½″ thickness. An arc plasma jet flame was applied to the surface of such block under the following conditions:

| | |
|---|---|
| Heat flux (B.t.u./ft.²-second) | 1000 |
| Gas enthalpy (B.t.u./lb.) | 6050 |
| Test duration in seconds | 24 |
| Stagnation pressure (p.s.i.g.) | 1.242 |
| Gas temperature (° F.) | 10025 |
| Gas velocity (ft./second) | 1913 | with the following results:

| | |
|---|---|
| Decrease in weight (grams) | 4.7874 |
| Percentage decrease in weight | 3.4 |
| Depth of erosion in inches in the surface so exposed | 0.199 |
| Final temperature in ° F.: | |
| (a) Back face | 140 |
| (b) Front face (optional) | 4820 |
| (c) Front face (total radiation) | 4340 |

Further tests were conducted in blocks of the same composition to determine the rate of erosion of the surface with the following results:

| Specimen | Heat flux (B.t.u./ft.² sec.) | Test time (sec.) | Erosion rate (mil/sec.) |
|---|---|---|---|
| A | 100 | 137 | 3.27 |
| B | 500 | 24 | 3.96 |
| C | 500 | 44 | 7.70 |
| D | 1,000 | 24 | 8.30 |

Further tests were conducted employing larger sheets of the same composition of like thickness which were tested in an oven over propane gas burners which were spaced 18″ on center and where the burners were placed 30″ from the face of the test panel. Propane gas was burned in the burners under the conditions hereinafter set forth. The temperatures at the face of the panel, toward which the flames were directed were measured by means of eight Chromel-Alumel thermocouples encased in ½ inch iron pipe and placed approximately 6″ from the panel face. The vertical and lateral placement of the thermocouples was determined by experimentation and visual observation of the flow pattern of the burning gases. Thermocouple leads were connected through a rotary switch to a Techniques Associates Pyrotemp Model 9-B pyrometer from which temperature readings were obtained manually. The backside temperatures were taken by placing seven iron-constantan thermocouples on the cross framing of the panel and with one thermocouple placed directly on the back surface of the composition. The following temperature readings in degrees Fahrenheit were taken from the panel face:

| Minutes | Temperature readings, degrees F., panel face — Station number | | | | | | | | Required temp. |
|---|---|---|---|---|---|---|---|---|---|
| | 1 | 2 | 3 | 4 | 5 | 6 | 7 | 8 | |
| 2 | 250 | 200 | 164 | 164 | 204 | 174 | 115 | 158 | |
| 5 | 490 | | | | | | | | 1,000 |
| 7 | 760 | 605 | 334 | 273 | 630 | 555 | 300 | 280 | 1,150 |
| 12 | 1,020 | 870 | 590 | | | | | | 1,340 |

The pressure of the gas flowing to the burners at the start of the test was five pounds per square inch which was increased to ten pounds per square inch after five minutes at which gas pressure the test was continued for the full duration of twelve minutes.

The temperatures at the back of the panel measured by the thermocouples as above described were as shown by the following table:

| Minutes: | Temperature readings, degrees F., panel back | |
|---|---|---|
| | Min. | Max. |
| 0 | 87 | 102 |
| 2 | 87 | 102 |
| 4 | 90 | 103 |
| 6 | 90 | 110 |
| 8 | 87 | 109 |
| 10 | 92 | 112 |
| 12 | 92 | 113 |
| 14 | 93 | 124 |
| 16 | 94 | 126 |
| 18 | 76 | 108 |

Further tests utilizing substantially the same equipment and test samples of the same character have been conducted wherein for a total elapsed time of two hours and fifteen minutes the average surface temperatures taken over the hot side surface have been in excess of 1900° F. and the temperature of the back face taken likewise over the distributed points as hereinabove indicated has been less than 180° F.

EXAMPLE III

The following materials were mixed and cast into sheet form which upon setting provided a material of excellent fire resistance, a sulfide surface coating being formed upon exposure to high temperature environment.

|   | Gms. |
|---|---|
| $CaSO_4 \cdot \tfrac{1}{2}H_2O$ | 1800 |
| Pulverized anthracite coal (—200 mesh) | 450 |
| Glass fibers (approx. 1") | 39.6 |
| Liquid phase | 900 |

The liquid phase was a solution of 5 ounces of polyvinyl acetate emulsion in 3 quarts of water.

Other forms of carbon, such as carbon black, pulverized charcoal and finely divided graphite may be substituted for coal in the above formula. The glass fibers and polyvinyl acetate may be omitted if high strength and flexibility is not necessary for the particular use. Other sulfates, such as barium sulfate, may be substituted for part or all of the calcium sulfate. Other polymers may be included as solutions or dispersions in the liquid phase to impart the special characteristics of these polymers. It will be understood that emulsifiers and dispersants as well as antifoaming agents may be included as desired.

PARTICLE SIZE

In order to illustrate the importance of particle size of carbonaceous materials the following samples were prepared and tested:

| Sample number | Organic additive | Approx. max. particle size (microns) | Vol. ratio $CaSO_4 \cdot \tfrac{1}{2}H_2O$ to organic |
|---|---|---|---|
| 1 | Ground nut shells | 74 | 1:1 |
| 2 | do | 74 | 2:1 |
| 3 | Phenolic Microballoons | 500 | 1:1 |
| 4 | do | 500 | 2:1 |
| 5 | Ground polyurethane | 1,000 | 2:1 |
| 6 | Polystyrene beads (expanded) | 7,000 | 2:1 |
| 7 | do | 2,000 | 2:1 |
| 8 | None | | |

These materials were mixed with water and cast into 3" x 3" x 1" test samples. After the samples had set they were subjected to a flame provided by an oxy-acetylene torch. The tip of the torch was approximately five inches from the sample surface and the torch was adjusted to provide a slight excess of oxygen. The condition and brightness of the surface of the material during the test was recorded photographically. Sample 8, which contained no carbonaceous additive, was taken as the control sample.

The samples containing the larger size particles exhibited severe surface erosion when exposed to the flame. The surface brightness of the control sample 8 was given a value of 1 and the relative brightness of the surface of the other samples was measured against this control value. Samples 1 and 2 had a relative surface brightness of about 32 and 64, respectively, representing a high surface reflectivity due to the formation of a uniform sulfide and/or oxide coating on the surface. Sample 5 showed substantially no increase in surface brightness over the control and samples 6 and 7 had a relative surface brightness of about 2. The relative surface brightness of samples 3 and 4 was intermediate between that of samples 6 and 7 and sample 1. On the basis of these tests I conclude that the maximum average particle size of carbonaceous material which will provide beneficial results pursuant to the present invention is about 500 microns. Samples 1–4 are representative examples within the scope of the invention. Samples 5 through 7 constitute representative examples where the average particle sizes are reduced to no greater than about 500 microns.

In order to account for the unexpected results, i.e., the formation of the thin adherent heat restrictive sulfide on the surface, and the fact that this material under these conditions exhibits these unusual properties of what I term heat rejection, I have endeavored to determine as nearly as possible the phenomena occurring under the conditions as set forth. It appears fundamentally that the reaction which is occurring under the influence of the heat application to the surface is that the calcium sulfate is reduced to calcium sulfide principally through the action of chemically active carbon in intimate contact with the sulfate. When this contact is maintained under the heat conditions defined there is a direct reduction to the sulfide principally through the formation of carbon dioxide liberated from the surface after or perhaps simultaneously with the formation and liberation from the material of water in the form of steam and the formation of some carbon monoxide and traces of what I am unable to explain of methane ($CH_4$) which is found by analysis of the gas leaving the surface of the material under the conditions hereinabove defined, indicating that there is present under the conditions of these tests an excess of reducing capacity. The primary reaction may be, in a somewhat simplified form, indicated by the following:

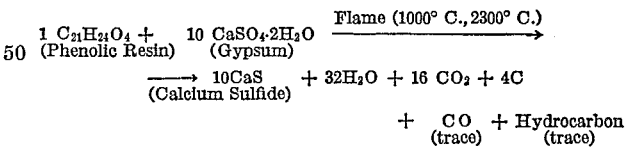

No attempt has been made to balance the above equation; this for the reason that depending upon the period of time that a gas analysis is made of the gases leaving the surface, the proportions of carbon dioxide, carbon monoxide, water and methane will obviously vary.

It has been found that upon the cooling of the composition after the formation of the calcium sulfide barrier upon its surface where the cooling has been permitted to take place in the atmosphere that there may be some deterioration of the adherent calcium sulfide layer upon the surface apparently due to its reaction with the water of the air resulting in the formation upon the surface of calcium oxide and calcium hydroxide along with some residual calcium sulfide depending upon the period of time when the observation is made. The material thus remaining upon the surface after exposure to the water in the air is a white powdery material and this material is no longer tightly adherent to the surface. The change in the surface condition which takes place when exposed to the water of the atmosphere has been found, however, to have no appreciable effect upon the heat barrier properties of the composition embodying my invention. When the surface of such composition is subjected to like heat conditions as hereinabove set forth the thin adherent coating of alkaline earth sulfide will again form upon the surface of the composition forming the same heat barrier characteristics hereinabove defined.

Having fully described my invention it is to be understood that I do not wish to be limited to the details hereinabove set forth. My invention is of the full scope of the appended claims.

What is claimed is:

1. A heat barrier comprising a bonded, intimate admixture of alkaline earth metal sulfate and finely divided carbonaceous material having a maximum average particle size below about 500 microns, said barrier having a substantially continuous surface coating consisting essentially of alkaline earth metal sulfide.

2. The heat barrier of claim 1 wherein the surface coating of alkaline earth metal sulfide is formed by in situ reaction of alkaline earth metal sulfate and carbon, provided by said carbonaceous material, under the influence of heat.

3. The heat barrier of claim 1 wherein the carbonaceous material in the admixture comprises free carbon.

4. The heat barrier of claim 1 wherein the carbonaceous material comprises a carbon-containing material which will char or coke under the influence of heat to provide available carbon.

5. The heat barrier of claim 1 wherein the carbonaceous material comprises a thermosetting plastic.

6. The heat barrier of claim 5 wherein the thermosetting plastic is a phenolic resin.

7. The heat barrier of claim 6 wherein the phenolic resin is in the form of Microballoons.

8. The heat barrier of claim 7 wherein the ratio of phenolic Microballoons to the alkaline earth sulfate by volume is in the order of about 7 to 3.

9. The heat barrier of claim 1 wherein the volume ratio of carbonaceous material to alkaline earth sulfate is in the range of about 0.1 to 5 parts by volume of carbonaceous material to 1 part by volume of alkaline earth sulfate.

10. The heat barrier of claim 1 wherein the admixture includes a thermoplastic material which increases the flexibility of said barrier.

11. The heat barrier of claim 1 wherein the admixture includes a fibrous material which resists the formation of fissures or cracks in the barrier during application of heat thereto.

12. The heat barrier of claim 11 wherein said fibrous material comprises glass fibers.

13. The heat barrier of claim 1 wherein the carbonaceous material comprises microspheres of a film-forming resin and a water-soluble or dispersible thermoplastic resin deposited within the barrier composition from a liquid carrier.

14. The heat barrier of claim 1 wherein the carbonaceous material comprises coal and a water soluble or dispersible thermoplastic resin deposited within the barrier composition from a liquid carrier.

15. The heat barrier of claim 1 wherein the alkaline earth metal sulfate comprises calcium sulfate.

16. The heat barrier of claim 1 wherein the alkaline earth metal sulfate comprises barium sulfate.

17. The heat barrier of claim 1 wherein the alkaline earth metal sulfate comprises magnesium sulfate.

18. The heat barrier of claim 1 wherein the alkaline earth metal sulfate comprises strontium sulfate.

References Cited

UNITED STATES PATENTS

| | | | |
|---|---|---|---|
| 2,797,201 | 6/1957 | Veatch et al. | 260—2.5 B |
| 3,104,196 | 9/1963 | Shannon | 260—2.5 B |
| 3,214,393 | 10/1965 | Sefton | 260—2.5 B |
| 3,257,338 | 6/1966 | Sefton | 260—2.5 B |
| 3,272,765 | 9/1966 | Sefton | 260—2.5 B |

MURRAY TILLMAN, Primary Examiner

M. FOELAK, Assistant Examiner

U.S. Cl. X.R.

106—105, 111, 113, 114, 115, 116; 260—2.5 B